Feb. 14, 1928.
A. Y. DODGE
1,659,021
BALL AND SLIP JOINT MECHANISM
Filed Dec. 23, 1924
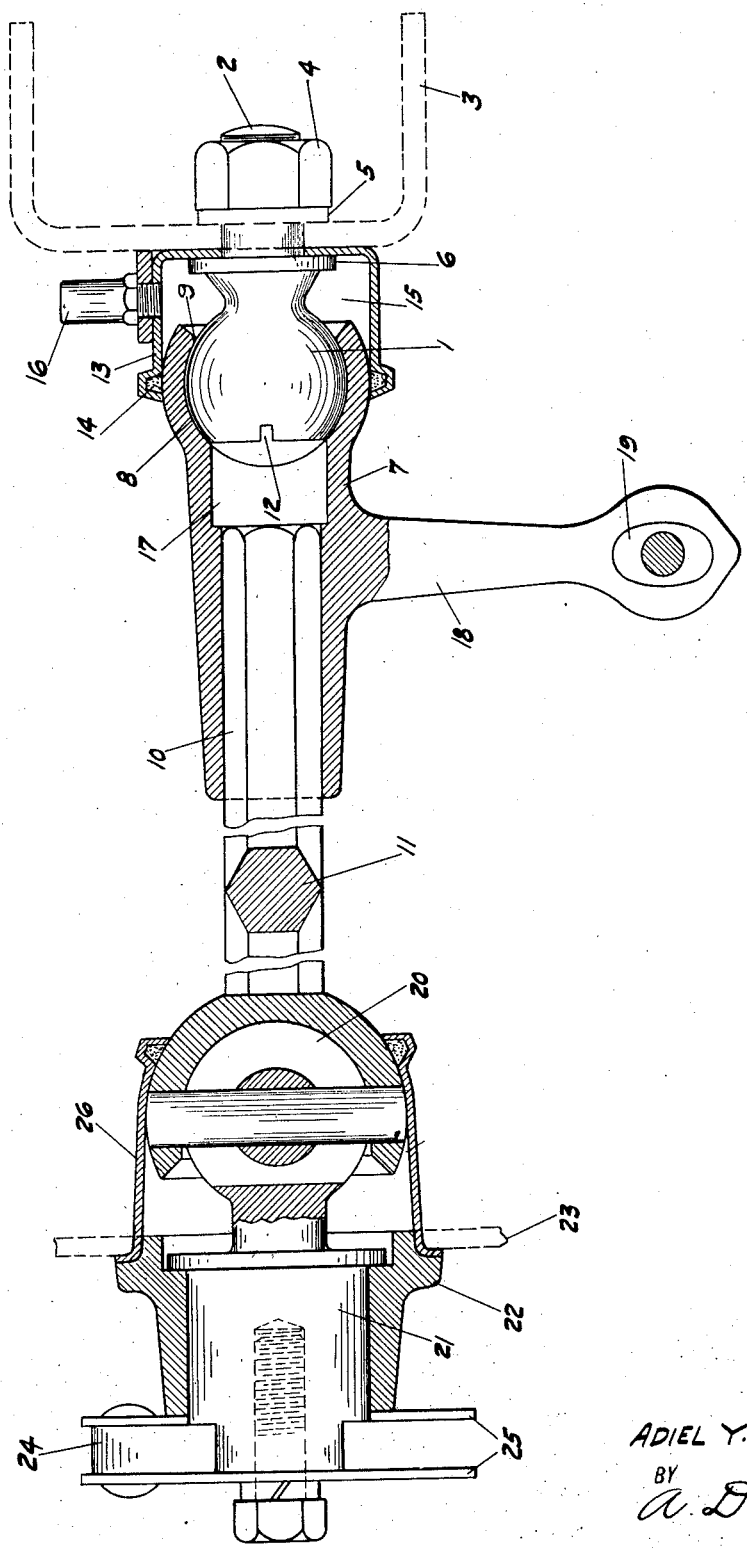
INVENTOR
ADIEL Y. DODGE
BY
A. D. T. Libby
ATTORNEY Patented Feb. 14, 1928.

1,659,021

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

BALL AND SLIP JOINT MECHANISM.

Application filed December 23, 1924. Serial No. 757,600.

This invention relates to a ball and slip joint mechanism wherein a transmitting or operating member, such as a shaft end, may have both sliding and an oscillatory movement.

My invention is particularly applicable in its use to the actuation of the front wheel brakes of a vehicle, because of the relative movement which takes place between the frame of the vehicle and the axle and the wheels.

In mechanical devices for operating front wheel brakes, such mechanism must be so applied as to properly actuate the brakes in a normal position of the vehicle, while, at the same time, producing no reaction on the brake pedal due to spring or vehicle movement.

It is one of objects of my invention to provide a slip and ball joint mechanism which will readily and efficiently respond to the movement of the chassis and which is unaffected in its action by said movements.

Another object of my invention is to provide a simple joint mechanism containing a relatively small number of parts and one that is therefore, easy and cheap to manufacture, yet, one that is light in weight, but still possessing ample strength.

Another object of my invention is to provide simple means for protecting the joint mechanism and for lubricating the same.

These and other objects will be readily understood from a reading of the specification taken in connection with the drawing in which the joint mechanism is shown partly in section together with the universal joint used in connection with the application to front wheel brake operating mechanism.

In the drawing 1 is a member, a ball shaped at one end and having the other end 2 preferably threaded for passing through a single hole in the side of the chassis 3; a nut 4, and lock washer 5 being used to engage the threaded end 2 to draw the shoulder portion 6 of the member 1 against the member 3. A slip joint member 7 has one portion 8 formed into a socket to fit the ball 1; the inner end 9 being spun over the ball so as to hold the members 7 and 1 securely together. Another portion of the member 7 is formed or machined to slidably receive the operating member or shaft 10, which, as shown at 11, is hexagonal in shape. It is to be understood that member 10 may take any other form, such as a square, or the end which operates in the member 7 may be splined while the exposed portion is of any desired shape. The member 7 is formed to suit the chosen construction of the end 10. It being understood that this end has a slidable motion in the member 7, but is prevented from rotating therein by the constructions previously referred to. The end of the ball 1 is slotted at 12 so that when the parts 7 and 1 are assembled to the chassis 3, a screw driver may be passed through the hollow portion 7 to hold the ball member 1 from turning as the nut 4 is tightened.

In order to protect the ball part of the joint, a pressed or formed metal cap 13, preferably cylindrical in shape, is provided. This cap is clamped against the chassis 3 by the shoulder 6; a gasket being used if desired. As shown in the drawing, the outer end of the member 13 is formed with a recess to receive a gasket of suitable material, which acts not only to retain the lubricant in the chamber 15, but, wipe off the dirt and grit which may collect on the outer surface of the socket portion 8. Instead of this construction however, I may utilize the same idea as disclosed in my application Serial No. 695,566 filed February 27, 1924, from which the edge of the member 13 may be reasonably sharp and have a tight fit on the socket 8, whereby a scraping action is obtained, as I have found it relatively easy to make such a cap shaped member, similar to 13, do its work even if its line of contact with the sphere or socket member is to the right of a vertical line passing through the center of the ball member, particularly, is this true if the scraping edge of the member 13 is slitted in a few places.

A lubricating device 16 is used for passing lubricant to the chamber 15. This lubricant finds its way into the chamber 17 of the member 7 and lubricates the end 10 of the sliding member. The member 7 has preferably formed integral therewith an operating lever 18; attachment being made thereto by means of the hole 19 in the end thereof.

In order to make the application of my invention fully understood, it may be mentioned that the other end of the shaft or operating member 10, terminates in a universal joint 20, one member of which 21 is rotatably supported in a carrier bracket 22 fastened to the cover or backing plate 23 which closes the opening into the brake drum; a cam 24 being held to the member 22 by two plates 25. It may be noted in passing that the protecting cap 26 of the universal joint 20, is held to the plate 23, when the bracket 22, is clamped thereto by bolts not shown.

Having thus described my invention what I claim is:

1. In a mechanism of the class described, a member having a ball shaped end with means for fastening said member to a support, a slip joint member having a socket portion formed over the ball end and another portion having a noncylindrical part to receive a force transmitting member to provide an axially-extensible torque-transmitting joint, and an operating lever rigidly carried by the slip joint member.

2. In a mechanism of the class described, a member having a threaded stud at one end and a ball at the other with a clamping shoulder intermediate the said ends, said ball having holding means on its outer extremity, and adapted to be engaged through a member co-operating with the ball, a slip joint member having a socket portion formed over the ball end and another portion having a noncylindrical part to receive a force transmitting member to provide an axially-extensible torque-transmitting joint, and an operating lever rigidly carried by the slip joint member.

3. In a mechanism of the class described, a member having a ball shaped end with means for fastening said member to a support, a slip joint member having a socket portion formed over the ball end and another portion formed with a noncylindrical part adapted to receive a force transmitting member to provide an axially-extensible torque-transmitting joint, a cap fastened to said support and extending over the outer surface of the socket portion of said slip member, means carried by the cap for passing lubricant to the space within its interior, means also carried by the cap at said part extended over said socket portion for retaining the lubricant within the cap and an operating lever fastened to the slip joint member.

4. In a mechanism of the class described, a member having a threaded stud at one end and a ball at the other with a clamping shoulder intermediate the said ends, a cylindrically shaped cap having a hole in the bottom through which said threaded stud may pass whereby said cap is held by said clamping shoulder securely against the support, said cap forming a lubricant chamber over the ball and the socket portion of the slip member and having means rubbing on the outer surface of the socket portion to retain the lubricant within said chamber, means for passing lubricant to the chamber within the cap and an operating lever integral with the slip joint member.

5. In a mechanism of the class described, a member having a ball shaped end and a single means for fastening it to a support, a hollow tubular member having the inner surface of one end formed with a noncylindrical part adapted to receive a force transmitting member to provide an axially-extensible torque transmitting joint, and the inner surface of its other end formed into a socket over the ball member to permanently hold the two members together, a protecting and lubricant reservoir cap held in position over the ball and socket by said single fastening means, means to pass lubricant to the reservoir without the cap, and a lever fastened to said tubular member for the purposes described.

6. In a mechanism of the class described, a member having a ball shaped end and a single means for fastening it to a support, a hollow tubular member having the inner surface of one end formed with a noncylindrical part adapted to receive a force transmitting member to provide an axially-extensible torque transmitting joint, and the inner surface of its other end formed into a socket over the ball member to permanently hold the two members together, means on the outer surface of the ball end, and engageable through said tubular member for holding it from turning while the support fastening means is being applied, a protecting and lubricant reservoir cap centrally supported over the ball and socket by said single fastening means, means for passing lubricant to the reservoir within the cap and an operating lever integral with said tubular member.

In testimony whereof, I affix my signature.

ADIEL Y. DODGE.